United States Patent
Kurohata

(10) Patent No.: US 6,454,672 B2
(45) Date of Patent: Sep. 24, 2002

(54) RATCHET TENSIONER WITH MECHANISM FOR LOCKING AND RELEASING A PLUNGER

(75) Inventor: Junya Kurohata, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/766,692

(22) Filed: Jan. 22, 2001

(30) Foreign Application Priority Data

Jan. 21, 2000 (JP) .......................................... 13068/2000

(51) Int. Cl.⁷ ................................................ F16H 7/08
(52) U.S. Cl. ...................... 474/111; 74/577 M; 74/533
(58) Field of Search .............................. 474/101, 109, 474/110, 111, 112, 119, 136; 74/577 M, 533; 188/31, 69

(56) References Cited

U.S. PATENT DOCUMENTS

| | | | | |
|---|---|---|---|---|
| 4,881,927 A | * | 11/1989 | Suzuki | 474/110 |
| 5,004,448 A | * | 4/1991 | Ojima | 474/111 |
| 5,004,449 A | * | 4/1991 | Ojima | 474/138 |
| 5,006,095 A | * | 4/1991 | Suzuki | 474/111 |
| 5,030,169 A | * | 7/1991 | Kiso et al. | 474/110 |
| 5,035,680 A | * | 7/1991 | Ojima | 474/138 |
| 5,055,089 A | * | 10/1991 | Ojima | 474/138 |
| 5,073,150 A | * | 12/1991 | Shimaya | 474/110 |
| 5,073,158 A | * | 12/1991 | Ojima | 474/138 |
| 5,370,584 A | * | 12/1994 | Todd | 474/110 |
| 5,908,363 A | * | 6/1999 | Suzuki | 474/101 |
| 5,913,742 A | * | 6/1999 | Nakamura et al. | 474/110 |
| 5,931,754 A | * | 8/1999 | Stief et al. | 474/109 |
| 6,045,471 A | * | 4/2000 | Suzuki | 474/109 |
| 6,059,678 A | * | 5/2000 | Suzuki | 474/110 |
| 6,244,981 B1 | * | 6/2001 | Simpson | 474/110 |

FOREIGN PATENT DOCUMENTS

| | | | |
|---|---|---|---|
| EP | 0 989 333 A1 | 3/2000 | |
| GB | 2 181 210 | * 4/1987 | ............ F16H/7/08 |
| JP | 01-12165 | 1/1989 | |
| JP | 10-2386 | 1/1998 | |
| JP | 11-344086 | 12/1999 | |

* cited by examiner

*Primary Examiner*—David A. Bucci
*Assistant Examiner*—Vicky A. Johnson
(74) *Attorney, Agent, or Firm*—Dann, Dorfman, Herrell and Skillman; Henry H. Skillman

(57) ABSTRACT

A ratchet tensioner includes a plunger locking and releasing mechanism for selectively locking and releasing a plunger relatively to a ratchet pawl pivotally mounted to a housing. The plunger locking and releasing mechanism has a lever-like pin contact portion formed integrally with a ratchet pawl body, a pin member-fitting hole formed in two opposed side walls of the housing in registry with the lever-like pin contact portion such that there being two pin-accommodating spaces defined between the lever-like pin contact portion and an inner peripheral surface of the pin member-fitting hole on opposite sides of the lever-like pin contact portion, and a pin member removably and selectively inserted in the pin-accommodating spaces. When the pin member is inserted in one of the two pin-accommodating spaces, the ratchet pawl body is turned in one direction to keep the engagement between the ratchet pawl and ratchet teeth formed on the plunger, thereby locking the plunger in position against movement relative to the housing, and when the pin member is inserted in the other pin-accommodating space, the ratchet pawl body is turned in the opposite direction to disengage the ratchet pawl from the ratchet teeth on the plunger against the force of a ratchet pawl spring, thereby allowing the plunger to project outward from the housing by the force of a plunger spring.

3 Claims, 6 Drawing Sheets

RATCHET TENSIONER WITH MECHANISM FOR LOCKING AND RELEASING A PLUNGER

BACKGROUND OF THE INVENTION

1. Field of the Invention

The present invention relates to a ratchet tensioner used to provide an appropriate tension to a timing belt or a timing chain of a vehicle engine, and more particularly to a ratchet tensioner having a mechanism for locking and releasing a plunger.

2. Description of the Related Art

The ratchet tensioner has been widely used for suppressing vibrations generated when a timing belt or a timing chain is traveling to transmit rotation between a crankshaft and a camshaft of an engine, and for maintaining an appropriate tension in the timing belt or chain. Such ratchet tensioner is constructed such that a plunger protruding from a housing of the tensioner presses the rear side of a free end portion of a tensioner lever pivotally mounted to a body of the engine, so that a shoe surface of the tensioner lever slidably contacts with a slack side of the chain to give an appropriate tension to the chain (see Japanese Patent Publication No. HEI-3-8415, Japanese Patent Laid-Open Publication No. HEI-10-2386, and Japanese Patent Laid-Open Publication No. HEI-11-344086).

A typical example of the known ratchet tensioners is shown in FIGS. 6 and 7. The tensioner 31 includes a housing 32, a plunger 33 slidably mounted in the housing 32 and urged by a plunger spring 36 so that one end 33A of the plunger 33 projects outward from the front surface of the housing 32. The tensioner 31 further has a ratchet pawl body 34 pivotally mounted by a shaft 34A to the housing 32. The ratchet pawl body 34 is received in a recess 32E defined between opposed side walls 32C, 32D in the housing 32, and urged by a ratchet pawl spring 38. The ratchet pawl body 34 has a ratchet pawl 34B engaged with a ratchet tooth 33B formed on a side surface of outer periphery of the plunger, so that a backward displacement of the plunger 33 is suppressed.

The ratchet tensioner 31 includes a buffer mechanism using a flow resistance of oil, and a backlash is maintained between the ratchet tooth 33B and the ratchet pawl 34B, so that the oil (not shown) is introduced into the interior of the plunger 33 from an external oil pump operating in synchronism with the engine via a check valve mechanism 35. When the plunger 33 receives shock from the tensioner lever, the plunger 33 is retracted against the force of a plunger spring 36 within a range of the backlash in a state that the ratchet tooth 33B and the ratchet pawl 34B are engaged. At that time, the check valve mechanism 35 is closed to leak the oil in the plunger 33 from between the outer peripheral surface of the plunger 33 and the inner peripheral surface of a plunger-accommodating hole of the housing 32, so that a shock force is relieved. Furthermore, reference numeral 32B in FIGS. 6 and 7 indicates a mounting hole for mounting the ratchet tensioner 31 to the engine body.

Additionally, the ratchet tensioner 31 comprises a plate 37 secured to an end of the shaft 34A of the ratchet pawl body projecting outside the housing 32. When the ratchet tensioner 31 is shipped or to be mounted to the engine, as shown in FIGS. 8 and 9, a stopper pin 39 is inserted into a pin inserting hole 37A of the plate 37 to contact with an outer wall end surface 32A of the housing 32 in a state that the ratchet tooth 33B and the ratchet pawl 34B are engaged, and thus the plunger 33 is retained so as not to fly out from the housing 32. In this case, after mounting the ratchet tensioner 31 to the engine, the stopper pin 39 is removed to place the tensioner 31 in an operating condition.

Furthermore, as other means for holding the plunger 33 in position against movement in the projecting direction when shipping the ratchet tensioner, as shown in FIGS. 10 and 11, the ratchet pawl body 34 is rotated by the rotation of the outer plate 37 to engage the ratchet tooth 33B with the ratchet pawl 34B, and then the stopper pin 39 is inserted through the pin inserting hole 37A of the outer plate 37 into a stopper hole 32C formed in the housing 32.

In the ratchet tensioner, it is necessary to pull in the plunger 33 that has been projected in case of repairing the engine, removing or mounting the chain. However, the prior ratchet tensioner has problems that the plunger 33 cannot be pushed simply into the interior of the housing, and the work for removing or mounting the chain cannot be performed simply, since the outer plate 37 is rotated to rotate the ratchet pawl body 34 so that it is possible to release the engagement of the plunger 33 serving as one-way mechanism, but there is not a mechanism for maintaining the state in that the engagement is released. Furthermore, it is difficult to insert a driver from a small window hole such as an engine service hole etc., for rotating the outer plate, and it is not capable of maintaining the disengagement state of the plunger. The ratchet tensioner further has problem that an extra component is necessary since the outer plate, which is a separate member, is mounted to a ratchet shaft secured to the ratchet pawl body.

SUMMARY OF THE INVENTION

Therefore, in view of the aforementioned problems, an object of the present invention is to provide a ratchet tensioner which is capable of rotating a ratchet pawl body in a direction to engage a ratchet pawl with a ratchet tooth formed on a plunger, thereby maintaining the plunger in its engaged state, or being capable of rotating the ratchet pawl body in the other direction to disengage a ratchet pawl from a ratchet tooth on the plunger, thereby easily releasing the engagement of the plunger and easily maintaining the plunger in its disengaged state, or being capable of rotating the ratchet pawl body in a direction or the other direction to engage a ratchet pawl with a ratchet tooth on a plunger, thereby maintaining the plunger in its engaged state or being capable of rotating the ratchet pawl body in the other direction to disengage a ratchet pawl with a ratchet tooth on the plunger, thereby easily releasing the engagement of the plunger and easily maintaining the plunger in its disengaged state.

To accomplish the above object, according to a first aspect of the present invention, there is provided a ratchet tensioner comprising: a housing having two opposed side walls defining therebetween a recess; a plunger retractably mounted in the housing with one end projecting outward from the housing, the plunger having a series of ratchet teeth formed on an outer peripheral surface of the plunger, a plunger spring acting between the housing and the plunger and urging the plunger in a direction to project outward from the housing; a ratchet pawl body received in the recess of the housing and pivotally mounted by a shaft to the housing, the ratchet pawl body having a ratchet pawl formed at one end of the ratchet pawl body; a ratchet pawl spring acting between the housing and the ratchet pawl body and urging the ratchet pawl body to turn about the axis of the shaft in a direction to engage the rachet pawl with the ratchet teeth on the plunger, thereby preventing the plunger from moving backward; and a plunger locking mechanism for locking the plunger in position against movement relative to the housing. The plunger locking mechanism has a lever-like pin contact portion formed integrally with the other end of the ratchet pawl body, a pin member-fitting hole formed in the opposed side walls of the housing in registry with the lever-like pin contact portion of the ratchet pawl body such that there being two pin-accommodating spaces defined between the lever-like pin contact portion and an inner peripheral surface of the pin member-fitting hole on opposite sides of the lever-like pin contact portion, and a pin member removably inserted in one of the pin-accommodating spaces to turn the ratchet pawl body in one direction to keep the engagement between the ratchet pawl and the ratchet teeth on the plunger.

According to a second aspect of the present invention, there is provided a ratchet tensioner comprising: a housing having two opposed side walls defining therebetween a recess; a plunger retractably mounted in the housing with one end projecting outward from a surface of the housing, the plunger having a series of ratchet teeth formed on an outer peripheral surface of the plunger; a plunger spring acting between the housing and the plunger and urging the plunger in a direction to project outward from the housing; a ratchet pawl body received in the recess of the housing and pivotally mounted by a shaft to the housing, the ratchet pawl body having a ratchet pawl formed at one end of the ratchet pawl body; a ratchet pawl spring acting between the housing and the ratchet pawl body and urging the ratchet pawl body to turn about the axis of the shaft in a direction to engage the rachet pawl with the ratchet teeth on the plunger, thereby preventing the plunger from moving backward; and a plunger releasing mechanism for releasing the plunger from locking engagement with the ratchet pawl. The plunger releasing mechanism has a lever-like pin contact portion formed integrally with the other end of the ratchet pawl body, a pin member-fitting hole formed in the opposed side walls of the housing in registry with the lever-like pin contact portion of the ratchet pawl body such that there being two pin-accommodating spaces defined between the lever-like pin contact portion and an inner peripheral surface of the pin member-fitting hole on opposite sides of the lever-like pin contact portion, and a pin member removably inserted in one of the pin-accommodating spaces to turn the ratchet pawl body in the opposite direction to disengage the ratchet pawl from the ratchet teeth on the plunger against the force of the ratchet pawl spring, thereby allowing the plunger to project outward from the housing by the force of the plunger spring.

According to a third aspect of the present invention, there is provided a ratchet tensioner comprising: a housing having two opposed side walls defining therebetween a recess; a plunger retractably mounted in the housing with one end projecting outward from a surface of the housing, the plunger having a series of ratchet teeth formed on an outer peripheral surface of the plunger; a plunger spring acting between the housing and the plunger and urging the plunger in a direction to project outward from the housing; a ratchet pawl body received in the recess of the housing and pivotally mounted by a shaft to the housing, the ratchet pawl body having a ratchet pawl formed at one end of the ratchet pawl body; a ratchet pawl spring acting between the housing and the ratchet pawl body and urging the ratchet pawl body to turn about the axis of the shaft in a direction to engage the rachet pawl with the ratchet teeth on the plunger, thereby preventing the plunger from moving backward; and a plunger locking and releasing mechanism for selectively locking and releasing the plunger relatively to the ratchet pawl. The plunger locking and releasing mechanism has a lever-like pin contact portion formed integrally with the other end of the ratchet pawl body, a pin member-fitting hole formed in the opposed side walls of the housing in registry with the lever-like pin contact portion of the ratchet pawl body such that there being two pin-accommodating spaces defined between the lever-like pin contact portion and an inner peripheral surface of the pin member-fitting hole on opposite sides of the lever-like pin contact portion, and a pin member removably and selectively inserted in the pin-accommodating spaces such that when the pin member is inserted in one of the two pin-accommodating spaces, the ratchet pawl body is turned in one direction to keep the engagement between the ratchet pawl and the ratchet teeth on the plunger, thereby locking the plunger in position against movement relative to the housing, and when the pin member is inserted in the other pin-accommodating space, the ratchet pawl body is turned in the opposite direction to disengage the ratchet pawl from the ratchet teeth on the plunger against the force of the ratchet pawl spring, thereby allowing the plunger to project outward from the housing by the force of the plunger spring.

In the ratchet tensioner provided in accordance with the first aspect of the present invention, when the pin member is inserted into one of the two spaces formed between the pin contact portion of the ratchet pawl body and the peripheral edge of the pin member-fitting hole, the ratchet pawl body is turned in the direction to keep the meshing engagement between the ratchet pawl and the ratchet tooth on the plunger. Thus the plunger is locked in position against movement relative to the housing.

In the ratchet tensioner provided in accordance with the second aspect of the present invention, when the pin member is inserted into one of the two spaces formed between the pin contact portion of the ratchet pawl body and the peripheral edge of the pin member-fitting hole, the ratchet pawl body is turned in one direction to disengage the ratchet pawl from the ratchet tooth on the plunger against the force of the ratchet pawl spring, thereby allowing the plunger to project from the housing by the force of the plunger spring.

In the ratchet tensioner provided in accordance with the third aspect of the present invention, when the pin member is inserted in one of the two pin-accommodating spaces, the ratchet pawl body is turned in one direction to keep the engagement between the ratchet pawl and the ratchet teeth on the plunger, thereby locking the plunger in position against movement relative to the housing, and when the pin member is inserted in the other pin-accommodating space, the ratchet pawl body is turned in the opposite direction to disengage the ratchet pawl from the ratchet teeth on the plunger against the force of the ratchet pawl spring, thereby allowing the plunger to project outward from the housing by the force of the plunger spring.

BRIEF DESCRIPTION OF THE DRAWINGS

The above objects, other objects, features and advantages of the present invention will be better understood from the following description taken in conjunction with the accompanying drawings, in which.

DETAILED DESCRIPTION OF THE PREFERRED EMBODIMENT

Now, a preferred embodiment of the present invention will be explained with reference to FIGS. 1 to 4.

Figure 1:
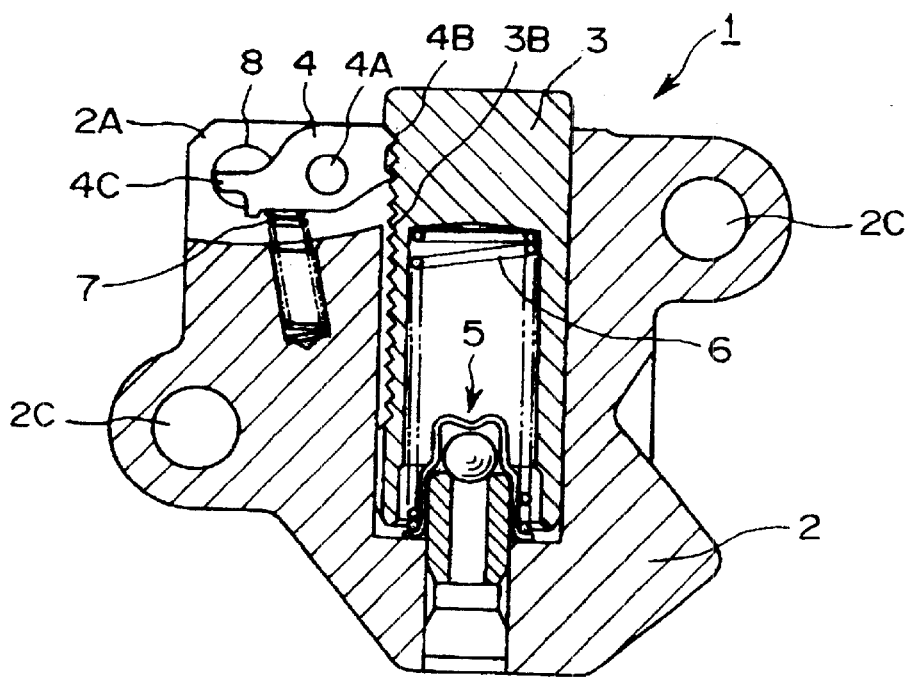
FIG. 1 is a cross-sectional view of a ratchet tensioner according to an embodiment of the invention.
Figure 2:
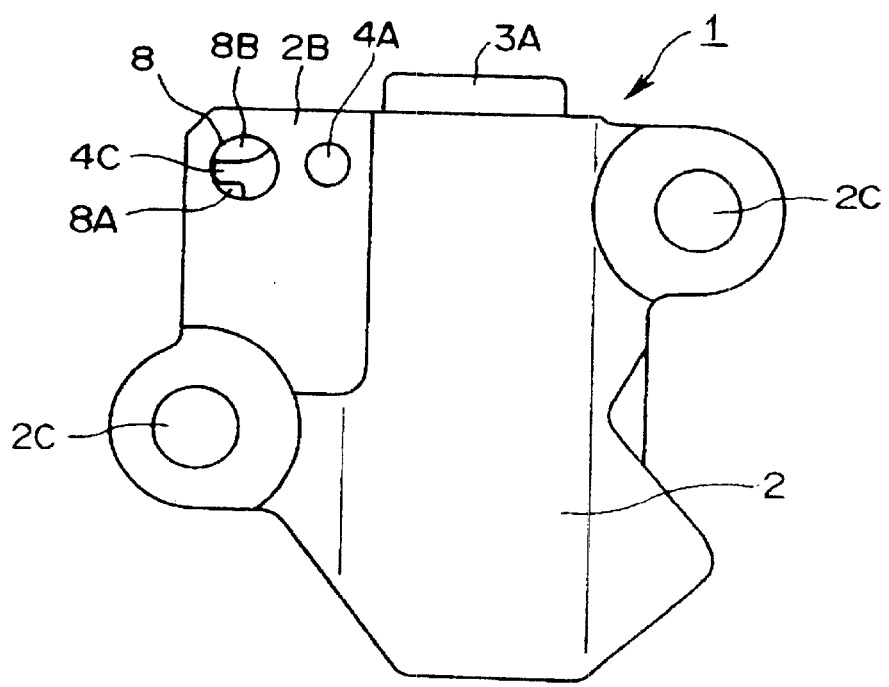
FIG. 2 is a front view of the ratchet tensioner shown in FIG. 1.

As shown in FIG. 1, a tensioner 1 embodying the present invention includes a housing 2, a plunger 3 retractably mounted in the housing 2 with one end 3A projecting outward from a front surface of the housing 2, the plunger 3 being urged by a plunger spring 6 in a direction to project outward from the housing 2, and a ratchet pawl body 4 pivotally mounted by a shaft 4A to the housing 2 and urged by a ratchet pawl spring 7 in a direction to lock the plunger 3 in position against movement in the projecting direction. The ratchet pawl body 4 has a pawl 4B formed at one end thereof and normally held in engagement with one of ratchet teeth 3B formed on a side surface of an outer periphery of the plunger so that the backward displacement of the plunger 3 is suppressed.

The ratchet tensioner 1 includes a buffer mechanism using a flow resistance of oil, and a backlash is maintained between the ratchet tooth 3B and ratchet pawl 4B. The buffer mechanism includes a check valve mechanism 5 through which an oil from an external oil pump (not shown) is introduced into the interior of the plunger 3. When the plunger 3 is subjected to a shock or impact force via a tensioner lever (not shown), the plunger 3 is retracted against the urging force of a plunger spring 6 within a range of the backlash in a state that the ratchet tooth 3B and the ratchet pawl 4B is engaged. At that time, the check valve mechanism 5 is closed to leak the oil in the plunger 3 from between the outer peripheral surface of the plunger 3 and the inner peripheral surface of a plunger-accommodating hole of the housing 2, so that the impact force is relieved. Also, if a belt, a chain or the like becomes slack due to elongation, the plunger 3 is projected by the plunger spring 6 and the oil from the external oil pump is supplied via the check valve mechanism into the plunger 3, and at the same time, engagement of the ratchet pawl 4B and the ratchet tooth 3B of the plunger 3 is displaced by 1 tooth, so that normally the plunger 3 serves as one-way mechanism following the belt, chain or the like.

Figure 3:
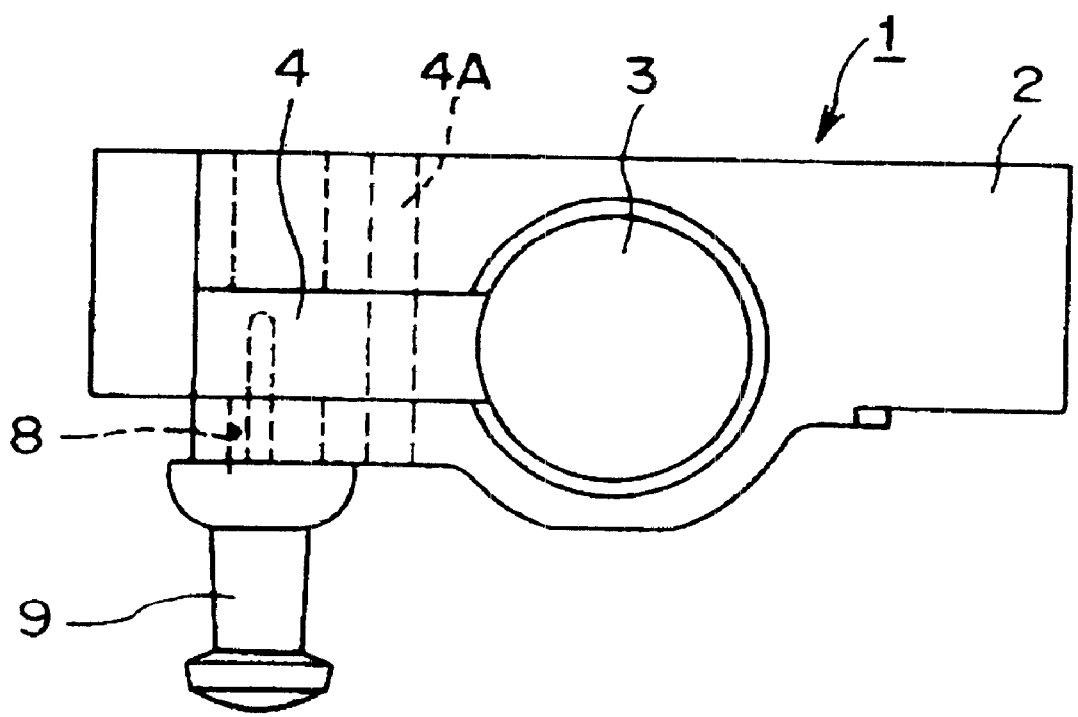
FIG. 3 is a plan view of the ratchet tensioner shown in FIG. 1.

The ratchet tensioner 1 includes a mechanism for controlling the plunger. The plunger controlling mechanism comprises a projecting lever 4C formed on the rear end of the ratchet pawl body 4 as a pin contact portion, and a pin member-fitting hole 8 formed in opposed side walls 2A, 2B of a recess of the housing 2 into which the ratchet pawl body 4 is received. The pin member-fitting hole 8 is substantially in registry with the pin contact portion (projecting lever) 4C of the ratchet pawl body 4. The pin member-fitting hole 8 is preferably penetrated into one of the both side walls 2A, 2B of the recess, for example a side wall 2B, but may be penetrated into both side walls. Although explained later, as shown in FIG. 3, the pin member 9 such as a conical-shaped pin, a cylindrical-shaped pin, a tip (− or +) of a driver, an awl and the like is inserted into the pin member inserting hole 8 to rotate the ratchet pawl body 4, so that the ratchet tooth 3B is engaged with the ratchet pawl 4B or disengaged from the ratchet pawl, thereby making or releasing the locking state of the plunger 3. Reference numeral 2C in FIGS. 1 and 2 denotes a mounting hole for mounting the ratchet tensioner 1 to the engine.

FIG. 1 shows an operation state (operation mode) of the ratchet tensioner 1 in which the pin member 9 is removed. Thus, the plunger 3 urged by the plunger spring 6 is able to project following the elongation of a chain in a state that the ratchet pawl body 4 serves as a ratchet mechanism. Namely, when an elongation of the belt, chain and the like occurs during the operation, the plunger 3 moves in the projecting direction by the force of the plunger spring 6 and, oil is supplied from outside into the interior of the plunger 3, and at the same time, engagement of the ratchet pawl 4B and the ratchet tooth 3B of the plunger 3 is displaced by 1 tooth. The plunger 3 thus becomes projected outside the housing 2 following the elongation of the belt, chain and the like.

Figure 4:
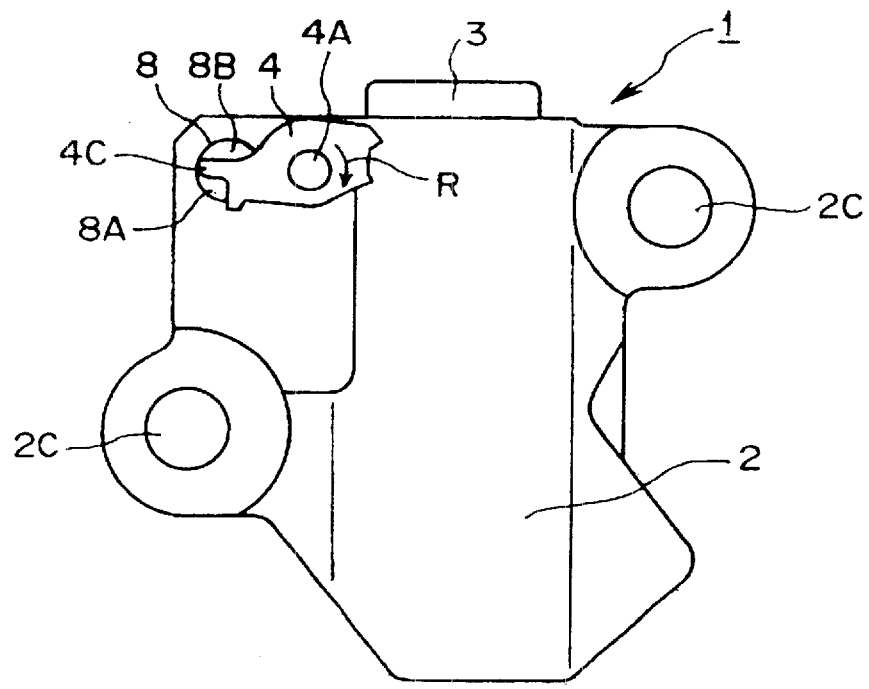
FIG. 4 is a front view of the ratchet tensioner shown in FIG. 1 when the plunger is in its engaged state.

In FIG. 4, a mechanism for engaging or locking the plunger 3 is shown. Also, FIG. 4 shows a state (shipping mode) in which the plunger 3 is fully pushed into the housing 2 when the ratchet tensioner 1 is shipped or to be mounted to an engine. In this case, the pin member 9 is inserted into a lower pin-accommodating gap or space 8A formed between the projecting lever 4C of the ratchet pawl body 4 and the inner peripheral edge of the pin member-fitting hole 8 to rotate the ratchet pawl body 4 in the direction of arrow R so that the ratchet pawl 4B is engaged with the ratchet tooth 3B formed on the plunger 3, thereby locking the plunger 3 in its engaged state.

Figure 5:
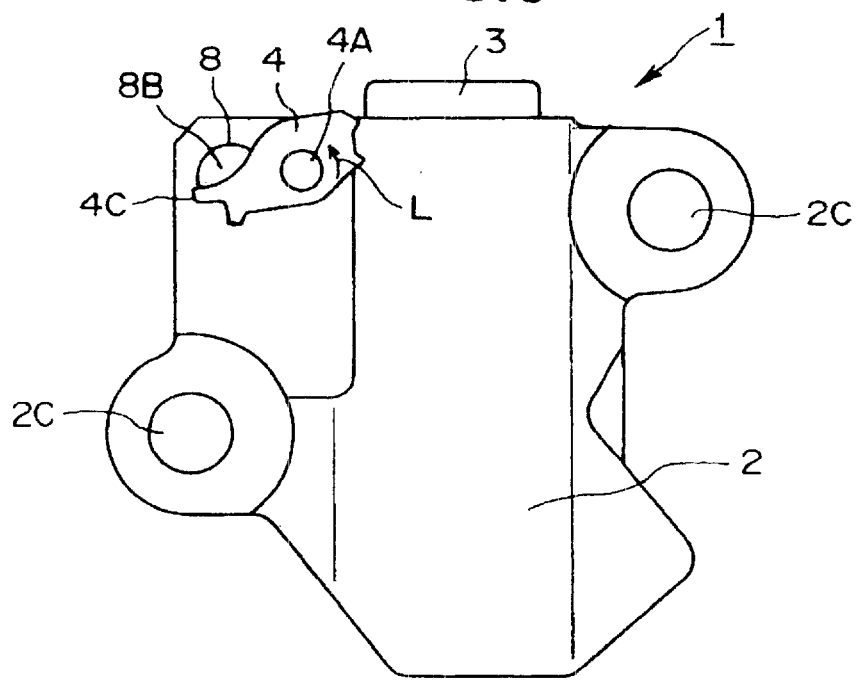
FIG. 5 is a front view of the ratchet tensioner shown in FIG. 1 when the plunger is in its disengaged state.
Figure 6:
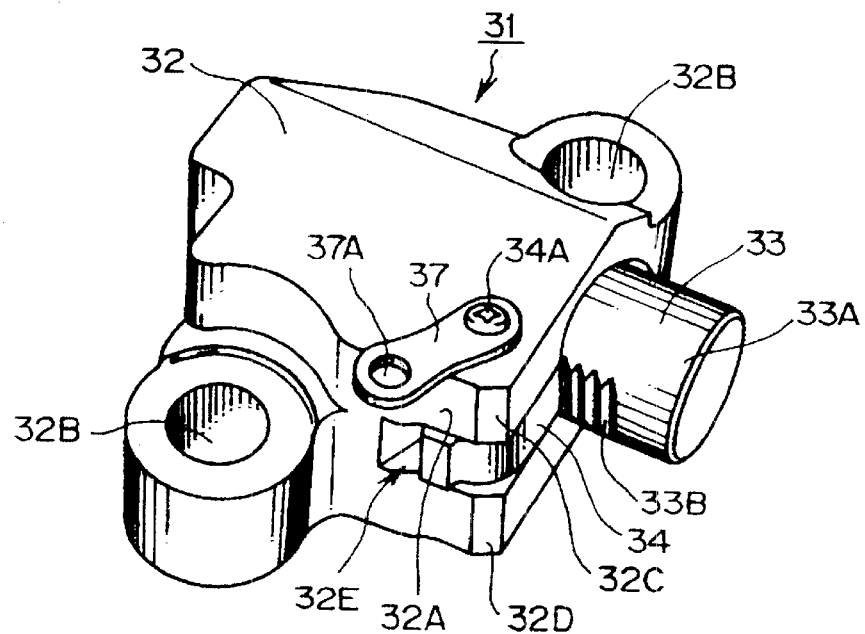
FIG. 6 is a perspective view showing an example of a conventional ratchet tensioner.
Figure 7:
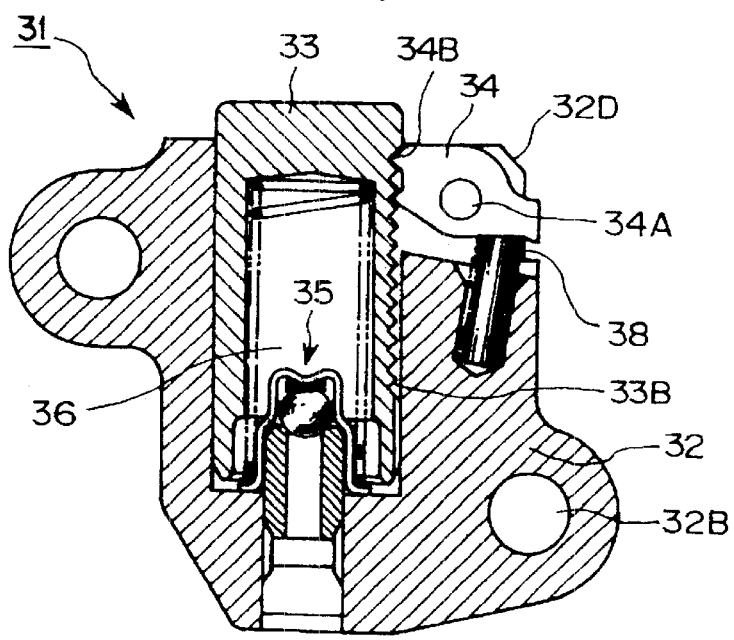
FIG. 7 is a cross-sectional view of the ratchet tensioner shown in FIG. 6.
Figure 8:
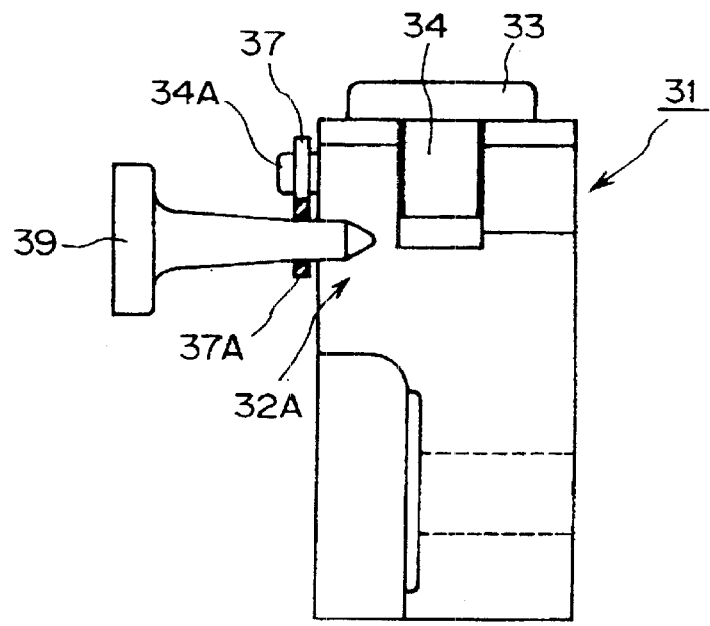
FIG. 8 is a side view of the ratchet tensioner shown in FIG. 6 when a plunger is in its engaged state.
Figure 9:
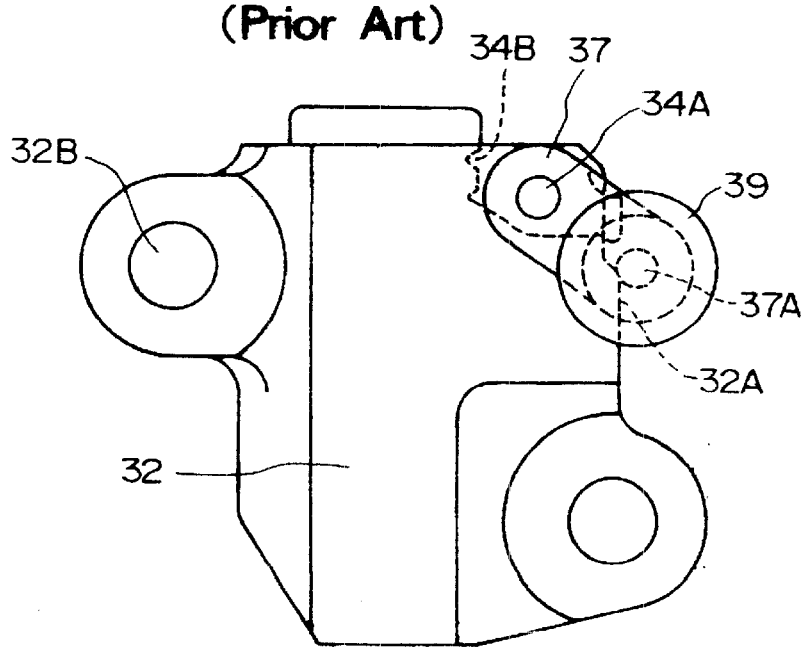
FIG. 9 is a front view of the ratchet tensioner shown in FIG. 6 when the plunger is in its engaged state.
Figure 10:
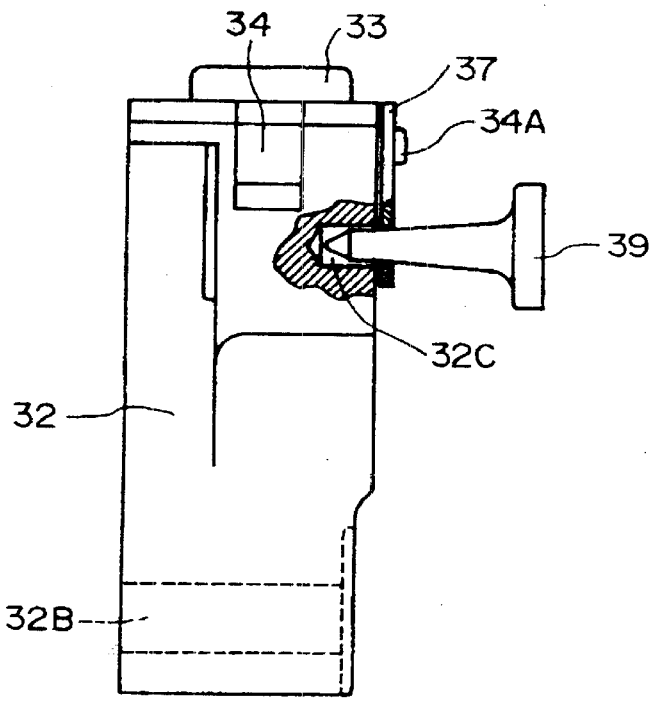
FIG. 10 is a partially cut-away side view showing another example of a conventional ratchet tensioner.
Figure 11:
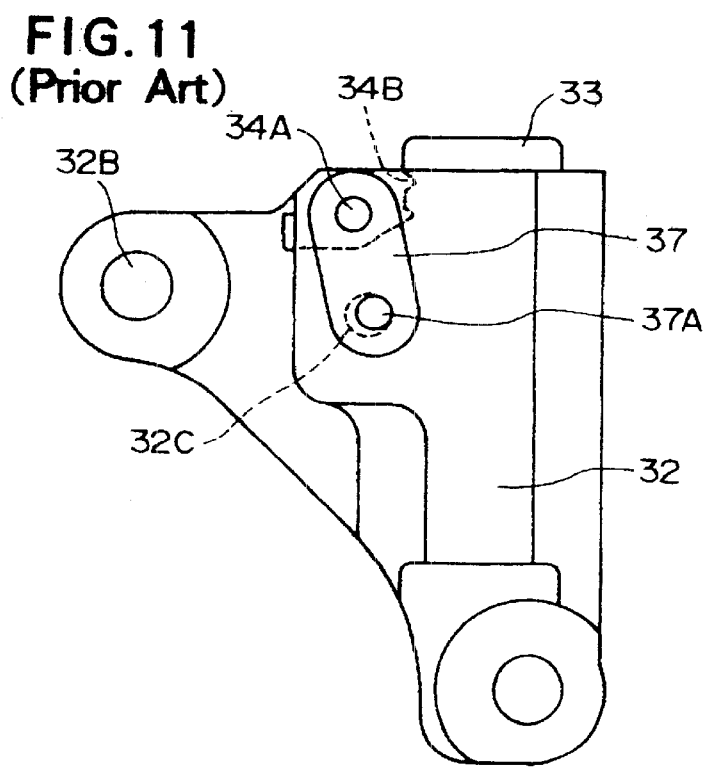
FIG. 11 is a front view of the ratchet tensioner shown in FIG. 10 when a plunger is in its engaged state.

FIG. 5 shows a mechanism for disengaging or releasing the plunger in a state (disengaging mode) in which the plunger 3 having been projected can be pushed into when repairing the engine or attaching and detaching the chain or belt. In case where the ratchet tensioner 1 is in an operation state shown in FIG. 1, and the plunger 3 is projected, if a pin member 9 is inserted into the upper pin-accommodating space 8B formed between the projecting lever 4C of the ratchet pawl body 4 and the inner peripheral edge of the pin member-fitting hole 8 of the housing 2, the ratchet pawl body 4 is rotated in the direction of arrow L so that two ratchet pawls 4B formed the ratchet pawl body 4 are simultaneously disengaged from the ratchet tooth 3B formed on the plunger 3. In this case, the operation for releasing engagement can be simply performed by inserting a conical pin member or by inserting and rotating a tip of a driver. As such, if the engagement of the ratchet pawl 4B with the ratchet tooth 3B formed on-the plunger 3, the plunger 3 is projected by the plunger spring 6, but is pushed into the housing with tool or manually. Here, if the pin member 9 is removed in the state that the plunger 3 is inserted into the housing 2, and subsequently, the pin member 9 is inserted into the lower pin-accommodating space 8A formed between the projecting lever 4C of the ratchet pawl body 4 and the inner peripheral edge of the pin member-fitting hole 8 as shown in FIG. 4, then the plunger 3 is secured in its engaged state, and the ratchet tensioner 1 becomes the shipping mode.

Since the ratchet tensioner 1 constituted as above includes a mechanism for engaging or locking the plunger, it is possible to engage the ratchet pawl 4B with the ratchet tooth 3B formed on the plunger 3, and to maintain the plunger in its engaged state by simple operation of inserting the pin member 9 into the lower pin-accommodating space 8A formed between the projecting lever 4C of the ratchet pawl body 4 and the inner peripheral edge of the pin member-fitting hole 8. Also, since the ratchet tensioner 1 includes a mechanism for disengaging or releasing the plunger, it is possible to release the engagement of the ratchet pawl 4B and the ratchet tooth 3B formed on the plunger 3, to maintain the plunger 3 in its disengaged state, and to push the plunger 3 into the housing 2 by simple operation of inserting the pin member 9 into the upper pin-accommodating gap or space 8B formed between the projecting lever 4C of the ratchet pawl body 4 and the inner peripheral edge of the pin member-fitting hole 8. Additionally, since the ratchet tensioner 1 includes a mechanism for controlling the plunger, it is possible to engage and disengage the plunger, and to secure the plunger 3 in its engaged state and to loose the chain so that the operation for the attaching and detaching the chain to the engine can be performed easily when repairing, by the operation of releasing the engagement of the plunger 3 and again inserting the pin member 9 into the lower pin-accommodating space 8A formed between the projecting lever 4C of the ratchet pawl body 4 and the inner peripheral edge of the pin member-fitting hole 8.

In the above example, although an oil-supplying ratchet tensioner as a ratchet tensioner has been explained, the present invention may be applied to a backlash-free ratchet tensioner, and in short, may be applied to a tensioner having a ratchet mechanism.

As explained above, the present invention has advantages as follows.

According to the first aspect of the invention having a mechanism for locking the plunger, the pin member is inserted into the lower pin-accommodating space formed between the pin contact portion of the ratchet pawl body and the peripheral edge of the pin member-fitting hole to rotate the ratchet pawl body so that the ratchet pawl is engaged with the ratchet tooth. Therefore, it is possible to secure the plunger in its engaged state and to prevent the plunger from projecting out of the housing.

According to the second aspect of the invention having a mechanism for releasing the plunger, the pin member is inserted into the upper pin-accommodating space formed between the pin contact portion of the ratchet pawl body and the peripheral edge of the pin member-fitting hole to rotate the ratchet pawl body, so that two ratchet pawls existing in front and rear are disengaged from the ratchet tooth, thereby releasing the engagement of the plunger. Therefore, it is possible for the plunger to freely appear and disappear from the housing so that the plunger can be simply pushed into the housing against the plunger spring. In this case, it is possible to rotate the ratchet pawl body by inserting a driver from the small window hole such as an engine service hole etc., and simply inserting the pin member into the pin member-fitting hole.

According to the third aspect of the invention having a mechanism for controlling the plunger, the pin member is inserted into a pin-accommodating gap or space formed between the pin contact portion of the ratchet pawl body and the peripheral edge of the pin member-fitting hole to rotate the ratchet pawl body so that the ratchet pawl is engaged with the ratchet tooth, thereby securing the plunger in its engaged state. Therefore, it is possible to prevent the plunger from projecting out of the housing. If the pin member is inserted into the other pin-accommodating gap or space to rotate the ratchet pawl body in a reverse direction so that the ratchet pawl is disengaged from the ratchet tooth and the engagement of the plunger is released, then the plunger is in a free state, and the plunger can be simply pushed into the housing against the plunger spring. Thus, it is possible to secure the plunger in its engaged state and to prevent the plunger from projecting out of the housing by the operation of removing the pin member in a state that the plunger was pushed and again by inserting the pin member into the lower space formed between the pin contact portion of the ratchet pawl body and the peripheral edge of the pin member-fitting hole by means of the mechanism for engaging to rotate the ratchet pawl body so that the ratchet pawl is engaged with the ratchet tooth. By means of above operations, it is possible to loose the chain and make the attaching and detaching thereof ease when repairing etc.

Furthermore, according to the first to third inventions, since the ratchet pawl can be engaged or disengaged with the ratchet tooth with rotation of ratchet by simple operation of inserting the pin member into one pin-accommodating space or the other pin-accommodating space formed between the pin contact portion of the ratchet pawl body and the peripheral edge of the pin member-fitting hole, it is possible to perform the engagement and disengagement of the plunger and the maintaining thereof easily by inserting the driver, etc. from a small window hole of the engine service hole and the like, and thereby improving maintenance performance of the engine.

Moreover, since the conventional ratchet tensioner can be used, and the outer plate, which is a separate member, can be eliminated, it is possible to suppress the cost-up and to minimize the space occupied by the engine. Therefore, the ratchet tensioner having a mechanism for formed the plunger without increasing of the number of components, is provided.

Although technical spirits of the present invention has been disclosed with reference to the appended drawings and the preferred embodiments of the present invention corresponding to the drawings has been described, descriptions in the present specification are only for illustrative purpose, not for limiting the present invention.

Also, those who are skilled in the art will appreciate that various modifications, additions and substitutions are possible without departing from the scope and spirit of the present invention. Therefore, it should be understood that the present invention is limited only to the accompanying claims and the equivalents thereof, and includes the aforementioned modifications, additions and substitutions.

What is claimed is:

1. A ratchet tensioner comprising:
 a housing having two opposed side walls defining therebetween a recess;
 a plunger retractably mounted in the housing with one end projecting outward from the housing, the plunger having a series of ratchet teeth formed on an outer peripheral surface of the plunger;
 a plunger spring acting between the housing and the plunger and urging the plunger in a direction to project outward from the housing;
 a ratchet pawl body received in the recess of the housing and pivotally mounted by a shaft to the housing, the ratchet pawl body having a ratchet pawl formed at one end of the ratchet pawl body;

a ratchet pawl spring acting between the housing and the ratchet pawl body and urging the ratchet pawl body to turn about the axis of the shaft in a direction to engage the rachet pawl with the ratchet teeth on the plunger, thereby preventing the plunger from moving backward; and a plunger locking mechanism for locking the plunger in position against movement relative to the housing, the plunger locking mechanism having
- a pin contact portion formed integrally with the other end of the ratchet pawl body,
- a pin member-fitting hole formed in the opposed side walls of the housing in registry with the pin contact portion of the ratchet pawl body such that there being two pin-accommodating spaces defined between the pin contact portion and an inner peripheral surface of the pin member-fitting hole on opposite sides of the pin contact portion, and
- a pin member removably inserted in one of the pin-accommodating spaces to turn the ratchet pawl body in one direction to keep the engagement between the ratchet pawl and the ratchet teeth on the plunger.

2. A ratchet tensioner comprising:

a housing having two opposed side walls defining therebetween a recess;

a plunger retractably mounted in the housing with one end projecting outward from a surface of the housing, the plunger having a series of ratchet teeth formed on an outer peripheral surface of the plunger;

a plunger spring acting between the housing and the plunger and urging the plunger in a direction to project outward from the housing;

a ratchet pawl body received in the recess of the housing and pivotally mounted by a shaft to the housing, the ratchet pawl body having a ratchet pawl formed at one end of the ratchet pawl body;

a ratchet pawl spring acting between the housing and the ratchet pawl body and urging the ratchet pawl body to turn about the axis of the shaft in a direction to engage the rachet pawl with the ratchet teeth on the plunger, thereby preventing the plunger from moving backward; and a plunger releasing mechanism for releasing the plunger from locking engagement with the ratchet pawl, the plunger releasing mechanism having
- a pin contact portion formed integrally with the other end of the ratchet pawl body,
- a pin member-fitting hole formed in the opposed side walls of the housing in registry with the pin contact portion of the ratchet pawl body such that there being two pin-accommodating spaces defined between the pin contact portion and an inner peripheral surface of the pin member-fitting hole on opposite sides of the pin contact portion, and
- a pin member removably inserted in one of the pin-accommodating spaces to turn the ratchet pawl body in the opposite direction to disengage the ratchet pawl from the ratchet teeth on the plunger against the force of the ratchet pawl spring, thereby allowing the plunger to project outward from the housing by the force of the plunger spring.

3. A ratchet tensioner comprising:

a housing having two opposed side walls defining therebetween a recess;

a plunger retractably mounted in the housing with one end projecting outward from a surface of the housing, the plunger having a series of ratchet teeth formed on an outer peripheral surface of the plunger;

a plunger spring acting between the housing and the plunger and urging the plunger in a direction to project outward from the housing;

a ratchet pawl body received in the recess of the housing and pivotally mounted by a shaft to the housing, the ratchet pawl body having a ratchet pawl formed at one end of the ratchet pawl body;

a ratchet pawl spring acting between the housing and the ratchet pawl body and urging the ratchet pawl body to turn about the axis of the shaft in a direction to engage the rachet pawl with the ratchet teeth on the plunger, thereby preventing the plunger from moving backward; and a plunger locking and releasing mechanism for selectively locking and releasing the plunger relatively to the ratchet pawl, the plunger locking and releasing mechanism having
- a pin contact portion formed integrally with the other end of the ratchet pawl body,
- a pin member-fitting hole formed in the opposed side walls of the housing in registry with the pin contact portion of the ratchet pawl body such that there being two pin-accommodating spaces defined between the pin contact portion and an inner peripheral surface of the pin member-fitting hole on opposite sides of the pin contact portion, and
- a pin member removably and selectively inserted in the pin-accommodating spaces such that when the pin member is inserted in one of the two pin-accommodating spaces, the ratchet pawl body is turned in one direction to keep the engagement between the ratchet pawl and the ratchet teeth on the plunger, thereby locking the plunger in position against movement relative to the housing, and when the pin member is inserted in the other pin-accommodating space, the ratchet pawl body is turned in the opposite direction to disengage the ratchet pawl from the ratchet teeth on the plunger against the force of the ratchet pawl spring, thereby allowing the plunger to project outward from the housing by the force of the plunger spring.

* * * * *